United States Patent
Vutukuri et al.

(10) Patent No.: US 11,032,712 B2
(45) Date of Patent: Jun. 8, 2021

(54) METHOD AND COMPUTING DEVICE FOR CARRYING OUT DATA INTEGRITY PROTECTION

(71) Applicant: ZTE Corporation, Guangdong (CN)

(72) Inventors: Eswar Kalyan Vutukuri, Guangdong (CN); He Huang, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/875,976

(22) Filed: May 15, 2020

(65) Prior Publication Data

US 2020/0322804 A1 Oct. 8, 2020

Related U.S. Application Data

(63) Continuation of application No. PCT/CN2017/111366, filed on Nov. 16, 2017.

(51) Int. Cl.
*H04W 12/106* (2021.01)
*H04L 29/06* (2006.01)
(Continued)

(52) U.S. Cl.
CPC ......... *H04W 12/106* (2021.01); *H04L 63/123* (2013.01); *H04W 12/02* (2013.01); *H04W 12/04* (2013.01); *H04W 36/0038* (2013.01)

(58) Field of Classification Search
CPC ......... H04W 12/1006; H04W 12/0013; H04W 28/0268; H04W 80/02; H04W 12/10; H04W 12/1008
See application file for complete search history.

(56) References Cited

U.S. PATENT DOCUMENTS

| | | | |
|---|---|---|---|
| 8,510,551 B1* | 8/2013 | Desai | H04L 63/0236 713/163 |
| 2014/0109072 A1* | 4/2014 | Lang | G06F 8/72 717/168 |

(Continued)

FOREIGN PATENT DOCUMENTS

| | | |
|---|---|---|
| CN | 102448058 A | 5/2012 |
| WO | 2016/069638 A2 | 5/2016 |
| WO | 2017/076891 A1 | 5/2017 |

OTHER PUBLICATIONS

International Search Report and Written Opinion dated Jun. 27, 2018 for International Application No. PCT/CN2017/111366, filed on Nov. 16, 2017 (9 pages).

(Continued)

*Primary Examiner* — Dung Hong
(74) *Attorney, Agent, or Firm* — Perkins Coie LLP

(57) ABSTRACT

A method for carrying out data integrity protection on a communication network. According to an implementation, a wireless communication device indicates, to a wireless network, the maximum data rate up to which integrity protection is supported for user plane data. A network node (e.g., a node of the core network, such as an SMF) receives this information and determines whether or not to enable integrity protection for user plane data based on the information (possibly in conjunction with other information such as the minimum data rate to be supported, etc.). The network node then communicates the decision to enable or disable integrity protection to a RAN node (e.g., a wireless base station).

19 Claims, 7 Drawing Sheets

(51) Int. Cl.
*H04W 12/02* (2009.01)
*H04W 12/04* (2021.01)
*H04W 36/00* (2009.01)

(56) References Cited

U.S. PATENT DOCUMENTS

2018/0089429 A1* 3/2018 Kamble ................ G06F 21/562
2019/0149993 A1* 5/2019 Tenny .................. H04W 76/10
  370/329
2019/0394651 A1* 12/2019 Wifvesson ............ H04W 12/10

OTHER PUBLICATIONS

Qualcomm Incorporated, "Usage of data integrity protection for DRB in NR," 3GPP TSG-RAN WG2 Meeting #99bis, Prague, Czech Republic, R2-1711520, 2 pages, Oct. 2017.

RAN2, "LS on usage of user plane integrity protection for DRB," 3GPP TSG-RAN WG2 #99bis, Prague, Czech Republic, R2-1712051, 2 pages, Oct. 2017.

"3rd Generation Partnership Project; Technical Specitication Group Services and System Aspects; Study on the security aspects of the next generation system (Release 14)", 3GPP Draft; 33899-130, 3rd Generation Partnership Project (3GPP), Mobile Competence Centre; 650, Route Des Lucioles; F-06921 Sophia-Antipolis Cedex; France, Sep. 27, 2017 (Sep. 27, 2017), XP051361245, Retrieved from the Internet: URL:http://www.3gpp.org/ftp/tsg_sa/WG3_Security/TSGS3_LI/2017 66bis_Sophia/Docs/[retrieved on Sep. 27, 2017].

Extended European Search Report for EP Application No. 17932276, dated Mar. 23, 2021, 2 pages.

* cited by examiner

METHOD AND COMPUTING DEVICE FOR CARRYING OUT DATA INTEGRITY PROTECTION

CROSS REFERENCE TO RELATED APPLICATIONS

This patent document is a continuation of and claims benefit of priority to International Patent Application No. PCT/CN2017/111366, filed on Nov. 16, 2017. The entire content of the before-mentioned patent application is incorporated by reference as part of the disclosure of this application.

TECHNICAL FIELD

The present disclosure is related generally to wireless network communication and, more particularly, to a method and computing device for carrying out data integrity protection.

BACKGROUND

In telecommunications, one purpose of data integrity protection is to prevent messages from being modified during transit (e.g., so called "man-in-the-middle" attacks). In many systems, data integrity protection is facilitated by the use of Message Authentication Codes (MACs).

In many modern wireless systems, integrity protection and integrity verification and is carried out by a Packet Data Convergence Protocol (PDCP) entity. Before ciphering, the PDCP Protocol Data Unit (PDU) header and the data part of the PDU receives integrity protection.

At the transmitter side, the PDCP entity computes the value of the MAC-I (Message Authentication Code for Integrity Protection) field and the receiving PDCP entity verifies the integrity of the PDCP PDU by calculating the X-MAC. If the calculated X-MAC corresponds to the received MAC-I, integrity protection is verified successfully. An integrity protection key (KUPint) is used for the purpose of integrity protection for the DRB.

DRAWINGS

While the appended claims set forth the features of the present techniques with particularity, these techniques, together with their objects and advantages, may be best understood from the following detailed description taken in conjunction with the accompanying drawings of which:

DESCRIPTION

Figure 1:
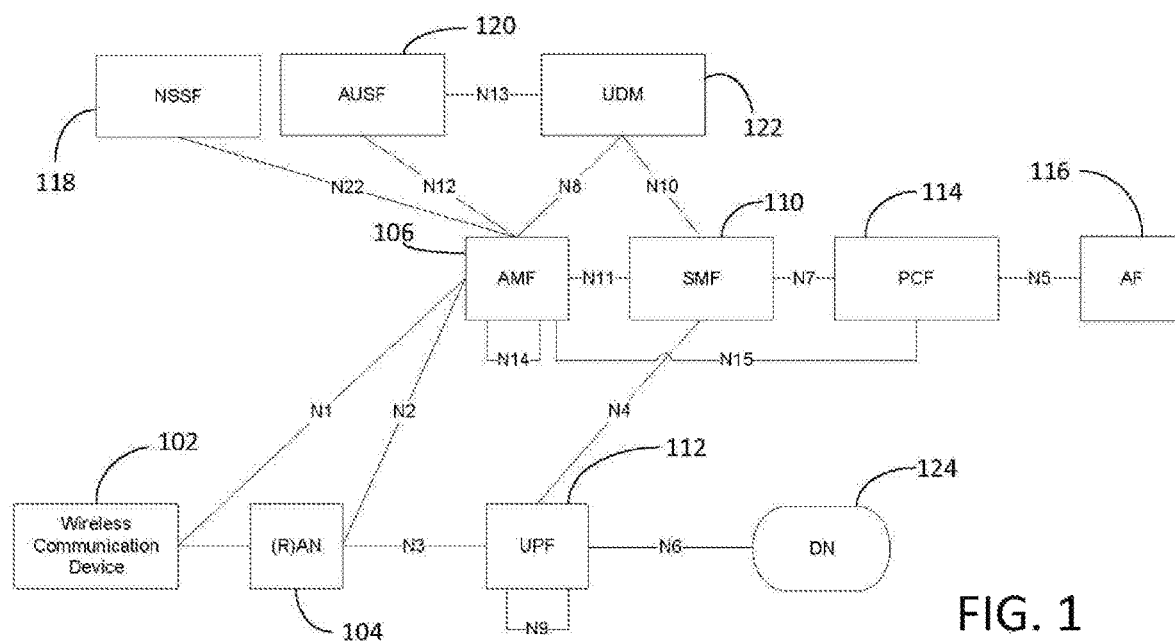
FIG. 1 depicts a wireless communication system in which the various embodiments may be deployed.

The present disclosure is generally directed to a method for carrying out data integrity protection on a communication network. According to an embodiment, a wireless communication device indicates, to a wireless network, the maximum data rate up to which integrity protection is supported for user plane data. A network node (e.g., a node of the core network, such as a Session Management Function (SMF)) receives this information and determines whether or not to enable integrity protection for user plane data based on the information (possibly in conjunction with other information such as the minimum data rate to be supported, etc.). The network node then communicates the decision to enable or disable integrity protection to a Radio Access Network (RAN) node (e.g., a wireless base station). The RAN node receiving the above information establishes a radio configuration based on the received information and communicates the radio configuration to the wireless communication device In an embodiment, the RAN node receives the Quality of Service (QoS) policy details and the security policy details from the core network (e.g., from the SMF). The QoS policy details include the data rate to be supported and the security policy details include whether or not to enable integrity protection and, if integrity protection is to be enabled, the maximum data rate up to which integrity protection is supported by the wireless communication device. Based on this information, the RAN node determining a QoS flow to DRB mapping. The RAN node then signals, to the wireless communication device, the radio resource configuration (including the QoS flow to DRB mapping) and whether or not to enable the integrity protection to a given DRB.

According to an embodiment, a first node (e.g., a computing device executing software that carries out a session management function) of the network receives, from a wireless communication device (possibly forwarded by another network node such as the AMF or the RAN node), a maximum data rate for which the wireless communication device supports integrity protection and, based on the received maximum data rate, makes a determination as to whether to enable data integrity protection for user plane data for communication involving the wireless communication device, and transmits the determination to a second node (e.g., a base station).

According to an embodiment, the method further involves receiving, from the wireless communication device (possibly via another network node such as the AMF or the RAN node), a service request comprising information (e.g., a quality of service profile) regarding a service to be established for the wireless communication device, and making the determination as to whether to enable integrity protection based further on the service to be established.

In an embodiment, the determination regarding whether to enable integrity protection is made based on whether the service to be established is the type of the service which for which user plane integrity protection is applicable.

According to an embodiment, the determination regarding whether to enable integrity protection is made based on a required data rate for the service to be established (e.g., by comparing the required data rate to the maximum data rate, the maximum data rate being the data rate up to which a wireless communication device can support integrity protection for user plane data). As a result of the decision, data integrity protection may be enabled, not enabled, or disabled. Additionally, a lower data rate for the session in a quality of service profile for the service may be indicated as a result of the decision.

In an embodiment, a method for carrying out data integrity protection on a communication network involves a radio access network node (e.g., a base station) receiving, from a core network node (e.g., an SMF) (a) a data rate for a first data flow and a data rate for at least one other data flow and (b) a security policy comprising a maximum data rate for which data integrity protection is to be applied to the first data flow. The network node determines a total data rate based on the data rate for the first data flow and the data rate for the at least one other data flow, makes a determination of whether or not to multiplex the first data flow onto the same data radio bearer as the at least one other data flow based on a comparison of the total data rate with the maximum data rate, and transmits, to a wireless communication device, a radio resource control message based on the determination.

According to an embodiment, making the determination involves determining that the total data rate is less than or equal to the maximum data rate. In this case, the radio resource control message indicates to the wireless communication device that the first data flow and the at least one other data flow are to be multiplexed onto the same data radio bearer.

In an embodiment, the network node establishes a communication session with the wireless communication device, such that the first data flow and the at least one other data flow are multiplexed within the session.

According to an embodiment, the network node determines that the total data rate is greater than the maximum data rate and the radio resource control message indicates to the wireless communication device that the first data flow and the at least one other data flow are not to be multiplexed onto the same data radio bearer.

In an embodiment, a method for carrying out data integrity protection involves a wireless base station carrying out the following actions: receiving, from a wireless communication device, a maximum data rate for which the wireless communication device supports integrity protection; transmitting the maximum data rate to node of a core network; in response to the transmitting, receiving a determination as to whether to enable integrity protection for user plane data for communication involving the wireless communication device; and transmitting a data radio bearer configuration to the wireless communication device based on the determination.

Turning to FIG. 1, a wireless communication system in which the various embodiments may be deployed is shown. In FIG. 1, there is depicted a wireless communication device 102 (e.g. a User Equipment ("UE")), which communicates via a RAN 104 and interacts with an AMF 106 via an N1 reference point. The RAN 104 interacts with the AMF 106 (via an N2 reference point) and a UPF 112 (via an N3 reference point). The AMF 106 interacts with: other AMFs (via an N14 reference point), an SMF 110 (via an N11 reference point), a PCF 114 (via an N15 reference point), an NSSF 118 (via an N22 reference point), an AUSF 120 (via an N12 reference point), and a UDM 122 (via an N8 reference point). The UDM 122 interacts with the AUSF 120 (via an N13 reference point) and with the SMF 110 (via an N10 reference point). The SMF 110 interacts with the PCF 114 (via an N7 reference point) and the UPF 112 (via an N4 reference point). The PCF 114 interacts with an AF 116 (via an N5 reference point). Finally, the UPF 112 interacts with other UPFs (via an N9 reference point) and a DN 124 (via an N6 reference point).

Each of the AMF 106, SMF 110, UPF 112, PCF 114, AF 116, NSSF 118, AUSF 120, and UDM 122 is implemented on computer hardware, although the components are often referred to by their respective functions. For example, the AMF 106 is, in an embodiment, a computing device that executes software implementing an access management function. This is also true of, for example, the SMF 110 (an embodiment of which is a computing device executing software implementing a session management function) and each UPF (an embodiment of which is a computing device executing software implementing a user plane function) and each component may be a separate, independent piece of hardware from the other components.

In an embodiment, PCF 114 (e.g., one or more computing devices that carry out a policy control function): support a unified policy framework to control network behavior, provides policy rules, and implements a front end to access subscription information relevant for policy decisions.

According to an embodiment, each AMF provides UE-based authentication, authorization, and mobility management. A wireless communication device operating in the system of FIG. 1 may be connected to a single AMF even when the device uses multiple access technologies.

In an embodiment, each SMF is responsible for session management and carries out tasks like allocating internet protocol (IP) addresses to wireless communication devices. An SMF may also select and control a UPF for data transfer. If a wireless communication device has multiple sessions, a different SMF may be allocated to each session so that each session can be managed individually.

According to an embodiment, the AF 116 provides information on packet flow to the PCF 114 in order to support Quality of Service (QoS). Based on the provided information, the PCF 114 determines policies regarding mobility and session management in order to ensure that the AMF and SMF carry out their respective functions properly.

In an embodiment, the AUSF 120 maintains data used to authenticate the wireless device 102, and the UDM 122 stores subscription data regarding the wireless device 102.

According to an embodiment, the NSSF 118, when the wireless device 102 requests a PDU session, the NSSF selects a particular slice for that session using Network Slice Selection Assistance Information (NSSAI) parameters provided by the wireless device 102 and the user subscription policies maintained by the PCF 114 and UDM 122.

In an embodiment, the DN 124 provides services such as operator services and internet access.

The RAN 104 of FIG. 1 includes one or more base stations, which interact with wireless communication devices. For example, FIG. 2 depicts the wireless communication device 102 communicating with a wireless base station 202 within the RAN 104.

Figure 2:
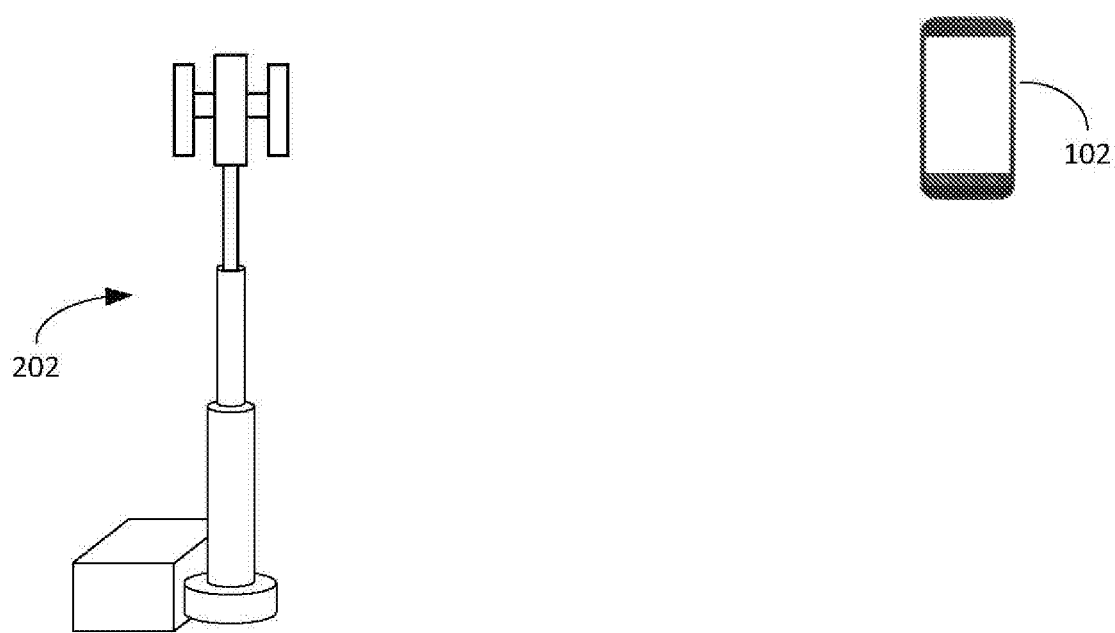
FIG. 2 depicts a wireless communication device communicating with a wireless base station within a RAN 104.

In an embodiment, RAN 104 has many components that are not depicted in FIG. 1 or FIG. 2, including other base stations, other wireless communication devices, wireless infrastructure, wired infrastructure, and other devices commonly found in wireless networks. Example implementations of the wireless communication device 102 include a smartphone, tablet, laptop computer, and non-traditional devices (e.g., household appliances or other parts of the "Internet of Things"). The base station 202, wireless communication device 102 and the various components of FIG. 1 may sometimes be referred to as "communication nodes."

Figure 3:
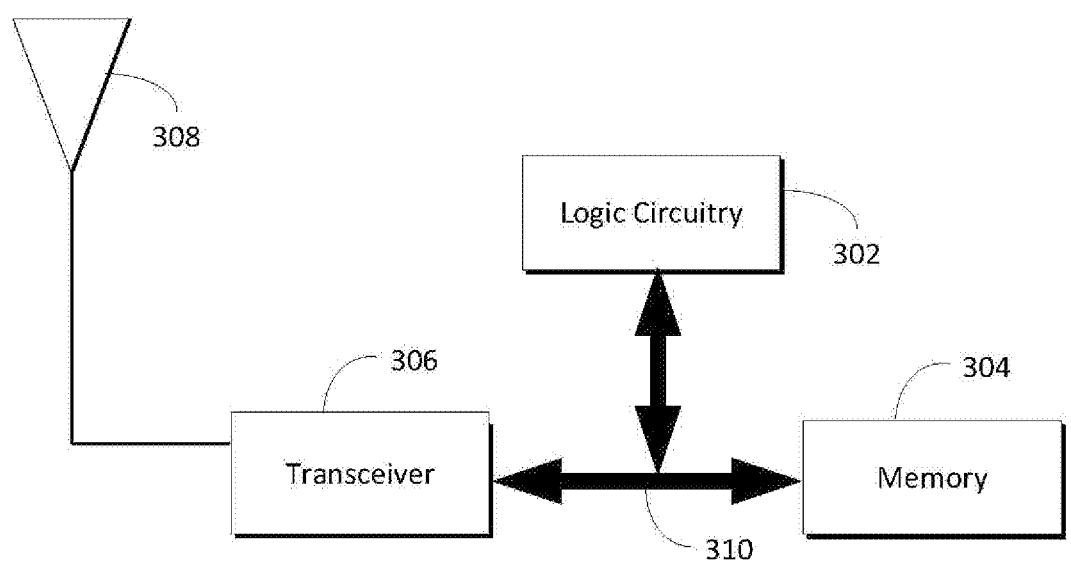
FIG. 3 illustrates a basic (computing device) hardware architecture found in the devices depicted in FIG. 1 and FIG. 2.

FIG. 3 illustrates a basic (computing device) hardware architecture found in the devices depicted in FIG. 1 and FIG. 2, according to an embodiment. The various device have other components as well, some of which are common to both and others that are not. The hardware architecture depicted in FIG. 3 includes logic circuitry 302, memory 304, transceiver 306, and one or more antennas represented by antenna 308. Each of these elements is communicatively linked to one another via one or more data pathways 310.

Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Possible implementations of the memory 304 include: volatile data storage; nonvolatile data storage; electrical memory; magnetic memory; optical memory; random access memory ("RAM"); cache memory; and hard drives.

The following description will sometimes refer to components like those shown in FIG. 1, FIG. 2, or FIG. 3 (such as an AMF or SMF) without specific reference to FIG. 1, FIG. 2, or FIG. 3. It is to be understood, however, that all of the methods described herein may be carried out by the components enumerated in these figures, and that references to components without specific reference numbers are merely for convenience. Also, for each of the procedures described, in an embodiment, the steps are carried out in the order that the language sets forth. In other embodiments, the steps are carried out in different orders.

Figure 4:
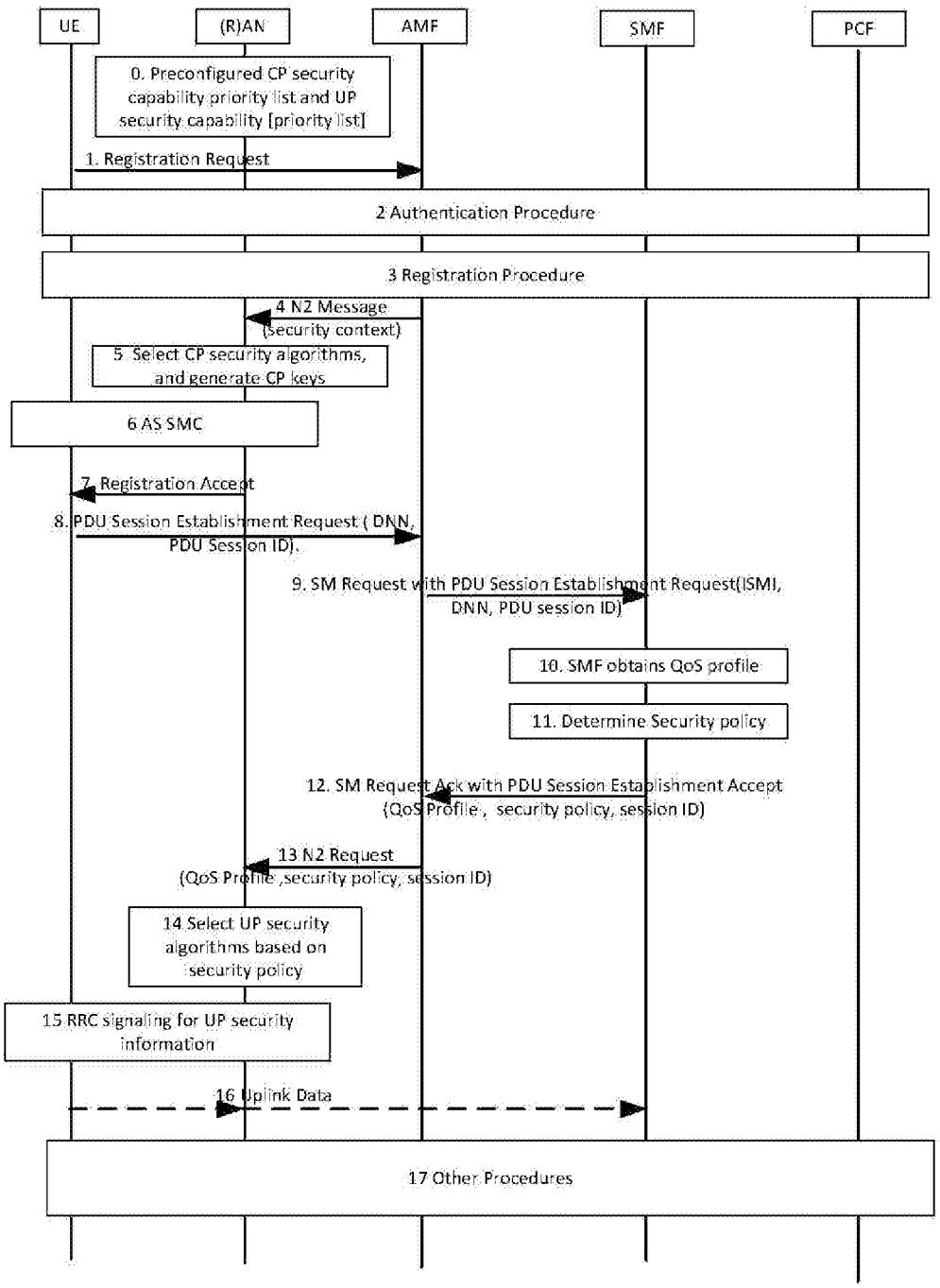
FIG. 4 depicts a user plane security negotiation process.
Figure 5:
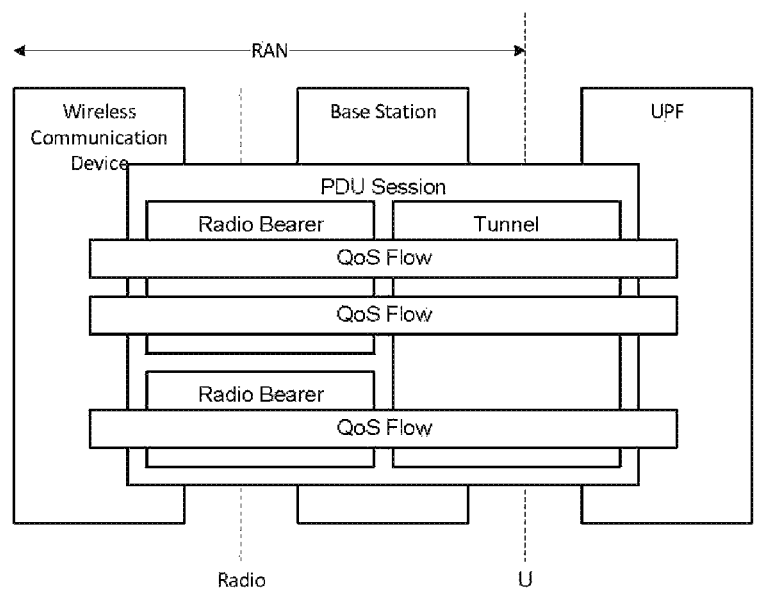
FIG. 5 depicts a quality of service architecture.

In various wireless network implementations, user plane security is established by negotiating the appropriate security parameters required based on the session requirements by the SMF as shown in FIG. 4. The overall QoS model is shown in FIG. 5 below. At the NAS level, the QoS flow is the finest granularity of QoS differentiation in a PDU session. A QoS flow is identified within a PDU session by a QoS Flow ID (QFI) carried in an encapsulation header.

Quality of service (e.g., reliability and target delay) is ensured by mapping packets to appropriate QoS Flows and DRBs. Hence, there is a 2-step mapping of IP-flows to QoS flows (NAS) and from QoS flows to DRBs (Access Stratum).

At the NAS level, a QoS flow is characterized by a QoS profile. The QoS profile is used by the RAN to determine the treatment on the radio interface while the QoS rules dictate the mapping between uplink User Plane traffic and QoS flows to the wireless communication device.

At the Access Stratum level, the data radio bearer (DRB) defines the packet treatment on the radio interface (Uu). A DRB serves packets with the same packet forwarding treatment. Separate DRBs may be established for QoS flows requiring different packet forwarding treatment. In the downlink, the RAN maps QoS Flows to DRBs based on QFI and the associated QoS profiles. In the uplink, the UE marks uplink packets over Uu with the QFI for the purposes of marking forwarded packets to the CN.

In the newest wireless communication technologies, integrity protection is enabled for user data over the DRB (Data Radio Bearer). The main use case for integrity protection for user data is IoT applications where integrity protection for DRBs is seen as useful to prevent security threats due to an attacker injecting spurious data. However, providing integrity protection results in additional overhead over the radio interface (due to the addition of the MAC-I field) and hence decreases the throughput over the air. Furthermore, the addition of the MAC-I field results in computational complexity (as the transmitter needs to calculate and add the MAC-I field for every PDCP PDU and the receiver needs to check the integrity of data by verifying the MAC-I received).

To avoid the above disadvantages for general user plane traffic, it has been proposed to preclude the use of integrity protection for any user plane data which can have an aggregated throughput that is above a fixed threshold (e.g. 1 Mbps).

The problem with the above approach is that there may be IoT services which may benefit from integrity protection of data but have an aggregate throughput above the proposed fixed threshold that will be specified in the standard. In short, a fixed data rate threshold for enabling/disabling the user plane integrity protection is not "future proofed" to accommodate a variety of IoT applications and does not fully exploit the capabilities of modern wireless communication devices (e.g., modern smartphones).

According to an embodiment, this potential problem is addressed through the use of a flexible DRB integrity protection data rate, which is supported via device capability indication (e.g., integrity protection capability indication provided by the wireless communication device). In this embodiment, instead of using a fixed data rate threshold for enabling user plane integrity protection, a variable data rate threshold (as indicated by the wireless communication device) is used to decide whether to enable or disable the integrity protection. The wireless communication device includes the data rate up to which it can perform integrity protection for the user plane as a unique capability (e.g., within the security capability container) and sends this information to the network.

Figure 6:
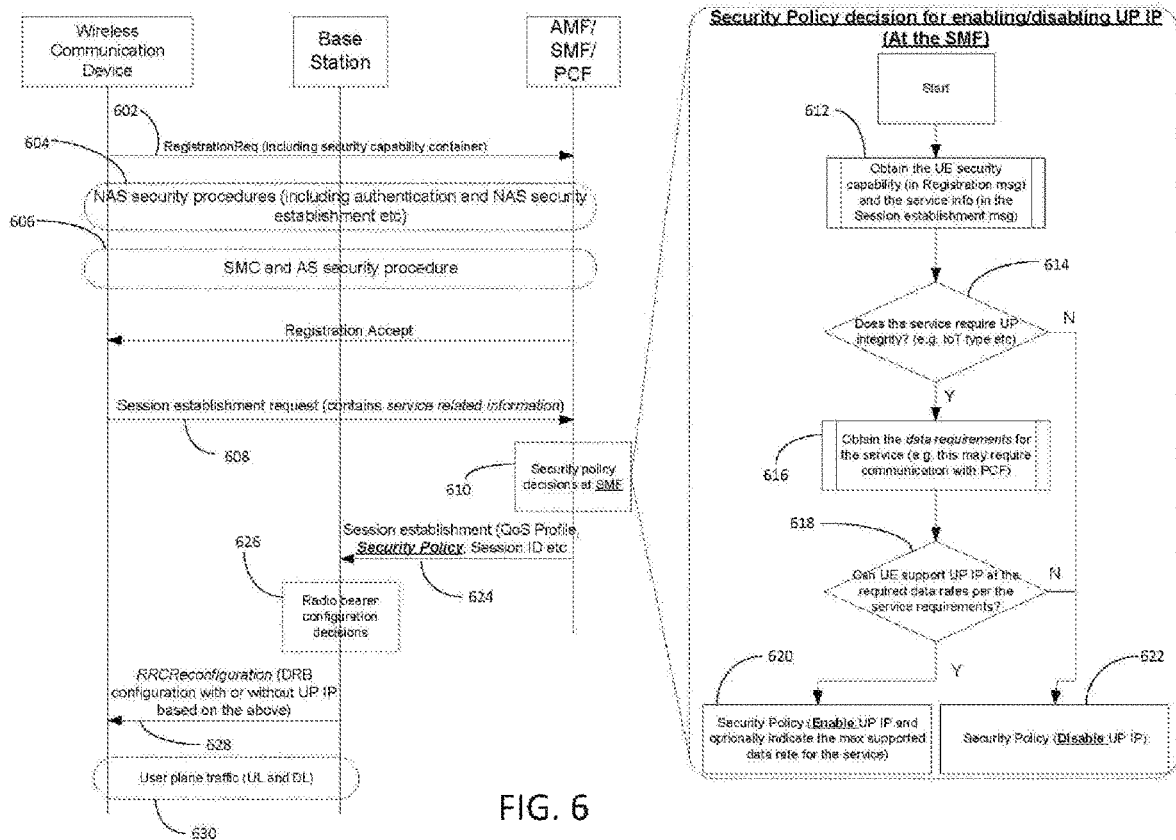
FIG. 6 depicts actions taken to carry out user pane integrity protection, according to an embodiment.

Referring to FIG. 6, an overall procedure according to an embodiment will now be described. The devices shown in FIG. 6 include a wireless communication device, a base station, and an AMF/SMF/PCF. These devices may have the same functionality as the similarly-named devices of FIG. 1, FIG. 2, and FIG. 3 The AMF/SMF/PCF may be a single computing device executing all three functions or may be multiple devices in communication with one another.

At 602, during a Registration procedure (e.g., network attach), the wireless communication device includes the security capability container in the capability IE, which is transmitted to the AMF/SMF (via the base station). The security capability container includes a specific IE indicating the UP integrity protection capability of the of the wireless communication device. Specifically, this includes an IE that indicates up to which data rate the wireless communication device can support user plane integrity protection. As an example, this may be indicated by including a field called upIntegrityProtectionMaxDataRate field in the security capability container. This field may take a range of values (e.g. {500 Kilobits per second (KBps), 1 Megabits per second (MBps), 10 MBps, 100 MBps}). It should be noted that the security capability container (or contents thereof) may be received indirectly (e.g., forwarded from another network node).

At 604, the network and wireless communication device proceed with establishing the NAS security by completing the NAS authentication and security establishment procedures At 606, the access stratum security is established (using the Security Mode Command at AS).

At 608, the establishment of the session specific parameters of the connection is performed by using the session establishment request.

At 610, the AMF receives the Session establishment request and passes on the requested session details to the SMF.

At 612, the SMF obtains the QoS profile of the session (e.g., by communicating with the PCF) and determines the required data rate characteristics to support the required QoS.

At 614, the SMF also determines whether UP integrity is applicable to this service. This may be performed by determining the type of the service (e.g. IoT type or a predetermined type for which UP integrity protection is applicable).

At 616, the SMF obtains the data requirements for the service (e.g., by communicating with the PCF) and determines the required data rate characteristics to support the data requirements.

At 618, the SMF determines whether UP integrity protection is applicable to the session or not by comparing the data rate requirements from the PCF to the maximum supported data rate with integrity protection (e.g., upIntegrityProtectionMaxDataRate field) as indicated by the wireless communication device in the security capability received from the wireless communication device. If the maximum supported data rate with integrity protection indicated by the wireless communication device is higher than the data rate requirements of the session, then UP integrity protection may be enabled for this session (at 620). Otherwise (e.g., the maximum supported data rate is less than the data rate requirements for the session as indicated by the QoS profile) the SMF may either decide to disable the UP integrity protection or indicate a lower data rate for the session in the QoS profile (at 622) and enable the UP integrity protection.

Based on the above decisions, the SMF compiles a security policy and QoS profile for the session. The security policy indicates (among other things), whether or not the user plane integrity is applicable to this session. It may also optionally indicate the maximum data rate up to which the integrity protection is supported by the wireless communication device. The QoS policy indicates the QoS requirements (including for instance the data rate to be supported—e.g., guaranteed bit rate requirements, etc.—if applicable) for the QoS flow specific to this service.

At 624 The SMF transmits the security policy and the QoS policy to the base station.

At 626, Based on the received policies, the base station determines the radio configuration (including the QoS flow to DRB mapping rules) and performs an RRC reconfiguration to provide the wireless communication device with a new DRB (if required), with or without integrity protection (per the indication in the Security profile obtained from the SMF).

At 628, the base station transmits the RRC reconfiguration to the wireless communication device.

At 630, the wireless communication device employs the RRC configuration to engage in UL and DL communication in the user plane.

During the session, it is the responsibility of the RAN node (i.e., the base station) to ensure that the aggregate bit rate over a given period of time on the DRB for which integrity protection is applicable, does not exceed the maximum rate indicated value indicated at step 624 if the base station already has the maximum rate for integrity protection (if, for example, the CN includes this information in the session establishment message). Alternatively, the base station may also have this information from initial exchanges with the wireless communication device (e.g., in which the base station receives the capability information from the wireless communication device).

In addition to the "future proofing" issues discussed above, another issue with current communication schemes is that data integrity protection is applicable to a given DRB, but multiple sessions (or flows) may be mapped on to the same DRB. This creates an additional problem in that the aggregated data rate of the combined flows mapped to a given DRB may result in the maximum data rate supported with user plane integrity protection being exceeded. Thus, a mechanism that allows a wireless base station (or other network node) to determine the QoS flow to DRB mapping without exceeding the UP integrity protection capability is needed to avoid this. To summarize, if multiple flows are mapped on to a given DRB that uses integrity protection, then the aggregated data rate over the DRB may exceed the capability of the wireless communication device to support integrity protection.

Figure 7:
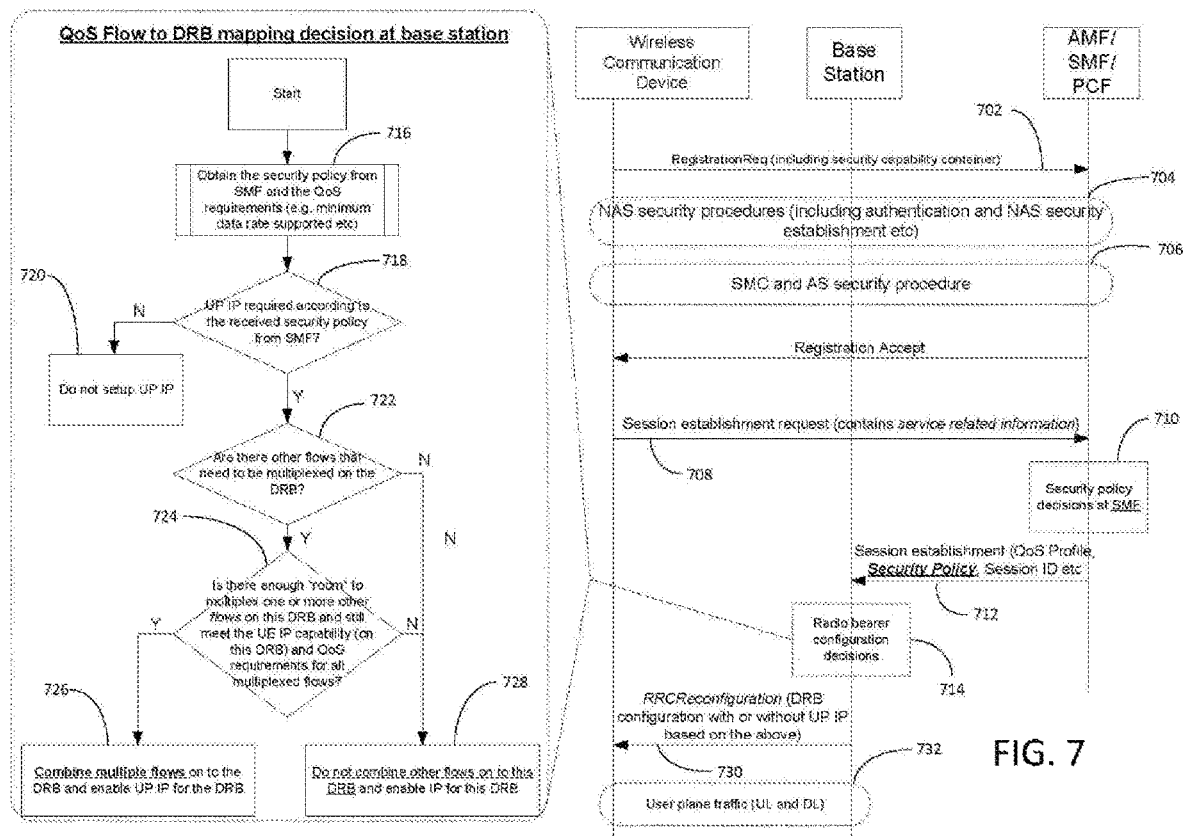
FIG. 7 depicts actions taken to determine QoS flow to DRB mapping when the DRB is subject to user pane integrity protection, according to an embodiment.

According to an embodiment, this problem is addressed through a new procedure for determining the QoS flow to DRB mapping when integrity protection is ON for a DRB. Turning to FIG. 7, an embodiment of this procedure will now be described.

Steps 702, 704, 706, 708, 710, and 712 are carried out in the same manner described above with respect to steps 602, 604, 606, 608, 610, and 612 of FIG. 6. At 714, the base station makes radio bearer configuration decisions as follows.

At 716, the base station obtains the QoS profile and the security policy decisions from the SMF.

At 718, the base station determines if integrity protection is applicable to the specific QoS flow (this is done based on the security policy received from the SMF). If it is not (i.e., integrity protection is not to be enabled), then the base station does not setup on user plane integrity protection (step 720).

If the integrity protection is applicable, then the base station checks if there are any other flows that may be mapped on to the same DRB (step 722) while still respecting the maximum data rate requirement of the flow with integrity protection (step 724). This decision is carried out by taking into account the data rate requirements in the QoS policy for each flow and the maximum data rate supported with integrity protection. For example, if there are two QoS flows, flow 1 and flow 2, integrity protection may be applicable for flow 1 while no integrity protection is applicable for flow 2. Further, if the data rate requirement (e.g. the minimum guaranteed bit rate) for flow 1 is R1 and the data rate requirement for flow 2 is R2, then the base station can multiplex flow 1 and flow 2 on to the same DRB if (R1+R2) is less than or equal to the maximum data rate supported with integrity protection as indicated in the UE capability (e.g., if (R1+R2)≤upIntegrityProtectionMaxDataRate). If, based on these factors, the flows can be multiplexed with UP IP, then the base station does so (step 726).

If this is not the case (e.g., (R1+R2)>upIntegrityProtectionMaxDataRate), then the base station does not multiplex flow 1 and flow 2 on to the same DRB (step 728).

Based on the above, the base station determines the DRB configuration and indicates the configuration to the UE in the RRC Reconfiguration message (step 730). This message includes configuration for one or more DRBs and indicates to the UE which DRB shall enable integrity protection per the received QoS policy and the Security policy.

At 732, the wireless communication device employs the RRC configuration to engage in UL and DL communication in the user plane.

Table 1 lists various abbreviations used in the present disclosure, along with their expanded forms.

TABLE 1

| Abbreviation | Expansion |
| --- | --- |
| AF | Application Function |
| AMF | Access and Mobility Management Function |
| AN | Access Network |
| AS | Access Stratum |
| AUSF | Authentication Server Function |
| BS | Base Station |
| CN | Core Network |
| DL | Downlink |
| DN | Data Network |
| $K_{UPint}$ | Integrity Protection Key |
| MAC | Message Authentication Code |
| NAS | Non-Access Stratum |
| NSSF | Network Slice Selection Function |
| PCF | Policy Control Function |
| PDCP | Packet Data Convergence Protocol |
| PDU | Protocol Data Unit |
| QoS | Quality of Service |
| RAN | Radio Access Network |
| RRC | Radio Resource Control |
| UDM | Unified Data Management |
| UL | Uplink |
| UP | User Plane |
| UPF | User Plane Function |

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described in conjunction with FIG. 6 and FIG. 7 can be reordered in ways that will be apparent to those of skill in the art.

The invention claimed is:

1. A method for carrying out data integrity protection on a communication network, the method comprising:
receiving, at a first node, a maximum data rate corresponding to a wireless communication device, the maximum data rate indicating a data rate up to which the wireless communication device supports integrity protection;
making a determination, based on the received maximum data rate, whether to enable data integrity protection for a user plane data session involving the wireless communication device;
compiling a security policy for the user plane data session based on the determination; and
transmitting the security policy to a second network node.

2. The method of claim 1, wherein the transmitting the security policy to the second network node comprises transmitting the security policy in a session establishment message.

3. The method of claim 1, wherein the first node is a session management function and the second node is a wireless communication base station.

4. The method of claim 1, wherein the transmitting the security policy to the second network node comprises:
transmitting, in a case that the security policy enables data integrity protection, the maximum data rate corresponding to the wireless communication device.

5. The method of claim 1, wherein the security policy indicates whether data integrity protection is applicable to the user plane data session and a maximum supported integrity protection data rate.

6. A method for carrying out data integrity protection at a wireless base station, the method comprising:
receiving a security policy compiled based on a determination as to whether to enable integrity protection for user plane data session involving a wireless communication device, wherein the determination is based on a maximum data rate corresponding to the wireless communication device, and wherein the security policy enables data integrity protection; and
transmitting a data radio bearer configuration to the wireless communication device based on the received security policy.

7. The method of claim 6, wherein receiving the security policy comprises receiving the security policy in a session establishment message.

8. The method of claim 6, wherein receiving the security policy comprises:
receiving, in a case that the determination enables data integrity protection, the maximum data rate corresponding to the wireless communication device.

9. An apparatus for carrying out data integrity protection on a communication network, the apparatus comprising:
at least one processor and memory containing instructions that when executed perform operations comprising:
receiving a maximum data rate corresponding to a wireless communication device, the maximum data rate indicating a data rate up to which the wireless communication device supports integrity protection;
making a determination, based on the received maximum data rate, whether to enable data integrity protection for a user plane data session involving the wireless communication device;
compiling a security policy for the user plane data session based on the determination; and
transmitting the security policy to a network node.

10. The apparatus of claim 9, wherein transmitting the security policy to the network node comprises transmitting the security policy in a session establishment message.

11. The apparatus of claim 9, wherein the apparatus is a session management function and the network node is a wireless communication base station.

12. The apparatus of claim 9, wherein the transmitting the security policy to the network node comprises:
transmitting, in a case that the determination enables data integrity protection, the maximum data rate corresponding to the wireless communication device.

13. An apparatus for carrying out data integrity protection at a wireless base station, the apparatus comprising:
at least one processor and memory containing instructions that when executed perform operations comprising:
receiving a security policy compiled based on a determination as to whether to enable integrity protection for user plane data session involving a wireless communication device, wherein the determination is based on a maximum data rate corresponding to the wireless communication device; and
transmitting a data radio bearer configuration to the wireless communication device based on the received security policy.

14. The apparatus of claim 13, wherein the receiving the security policy comprises receiving in a session establishment message.

15. The apparatus of claim 13, wherein the receiving the security policy comprises:
receiving, in a case that the determination enables data integrity protection, the maximum data rate corresponding to the wireless communication device.

16. A non-transitory computer readable medium storing executable instructions that when executed by at least one processor perform operations comprising:
- receiving, at a first node, a maximum data rate corresponding to a wireless communication device, the maximum data rate indicating a data rate up to which the wireless communication device supports integrity protection;
- making a determination, based on the received maximum data rate, whether to enable data integrity protection for user plane data session involving the wireless communication device;
- compiling a security policy for the user plane data session based on the determination; and
- transmitting the security policy to a second network node.

17. The non-transitory computer readable medium of claim 16, wherein the transmitting the security policy to the second network node comprises transmitting the security policy to the second network node in a session establishment message.

18. The non-transitory computer readable medium of claim 16, wherein the first node is a session management function and the second node is a wireless communication base station.

19. The non-transitory computer readable medium of claim 16, wherein the transmitting the security policy to the second network node comprises:
- transmitting, in a case that the determination enables data integrity protection, the maximum data rate corresponding to the wireless communication device.

* * * * *